United States Patent
Edwards et al.

(10) Patent No.: US 12,205,104 B2
(45) Date of Patent: Jan. 21, 2025

(54) DEACTIVATE VIRTUAL CARD NUMBERS BASED ON BILLING CYCLES

(71) Applicant: Capital One Services, LLC, McLean, VA (US)

(72) Inventors: Joshua Edwards, Philadelphia, PA (US); Michael Mossoba, Great Falls, VA (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 3 days.

(21) Appl. No.: 18/051,755

(22) Filed: Nov. 1, 2022

(65) Prior Publication Data

US 2024/0144240 A1   May 2, 2024

(51) Int. Cl.
G06Q 20/34 (2012.01)

(52) U.S. Cl.
CPC ......... G06Q 20/354 (2013.01); G06Q 20/351 (2013.01)

(58) Field of Classification Search
None
See application file for complete search history.

(56) References Cited

U.S. PATENT DOCUMENTS

| | | | |
|---|---|---|---|
| 6,422,462 B1 * | 7/2002 | Cohen | G07F 7/025 705/41 |
| 7,418,426 B1 | 8/2008 | Reunert et al. | |
| 8,571,985 B1 | 10/2013 | Grigg et al. | |
| 9,767,520 B2 | 9/2017 | Isaacson et al. | |
| 10,482,467 B1 | 11/2019 | Samitt et al. | |
| 10,740,852 B1 | 8/2020 | George et al. | |
| 11,256,789 B2 | 2/2022 | Jones | |
| 11,284,143 B2 | 3/2022 | Thomas et al. | |
| 2004/0210449 A1 * | 10/2004 | Breck | G06Q 20/105 705/39 |
| 2009/0070260 A1 | 3/2009 | Flitcroft et al. | |
| 2014/0019352 A1 | 1/2014 | Shrivastava | |
| 2018/0103086 A1 | 4/2018 | Jones-McFadden et al. | |
| 2021/0058657 A1 * | 2/2021 | Bates | H04N 21/25891 |
| 2021/0406896 A1 | 12/2021 | Chaturvedi | |
| 2022/0327539 A1 * | 10/2022 | Piparsaniya | G06Q 20/14 |
| 2023/0131942 A1 * | 4/2023 | Thomas | H04N 21/44226 725/14 |

OTHER PUBLICATIONS

S. Agarwal et al. "Regulating consumer financial products: Evidence from credit cards" Quarterly Journal 2015, academic.oup.com, Year 2015.

* cited by examiner

Primary Examiner — David P Sharvin
(74) Attorney, Agent, or Firm — Banner & Witcoff, Ltd.

(57) ABSTRACT

Aspects provided may allow for an entity to deactivate a virtual card number (VCN). In particular, aspects provide for deactivating VCNs based on a frequency or periodicity of an interaction. After deactivation, the entity may block future charges to the VCN. Further aspects provide for using incoming charge data sent to one or more previous users to train a machine learning model to determine the frequency or periodicity of the interaction. Additional aspects may also provide for including trial length when determining the deactivation date, providing VCN configuration options to a user, and notifying the user based on upcoming and current VCN status changes.

20 Claims, 10 Drawing Sheets

DEACTIVATE VIRTUAL CARD NUMBERS BASED ON BILLING CYCLES

FIELD

Aspects of the disclosure relate to computer implemented systems and methods for deactivating virtual card numbers (VCNs). More particularly, aspects relate to determining a frequency or periodicity of an interaction and deactivating the VCN based on the frequency of periodicity of the interaction.

BACKGROUND

Online shopping and services have never been more popular, and will likely continue to dominate consumer activity for years to come. In this environment, consumers have several priorities. First, consumers wish to protect private electronic payment information from bad actors. Second, consumers wish to have more control over payments for long-term purchases or recurring services.

In the past, while consumers had electronic payment methods in the form of credit and debit cards, these cards were tied to physical objects that the consumer presented at the place of purchase. This added a layer of security. To make a fraudulent purchase, a bad actor would have to physically steal a consumer credit card.

However, as consumer activity has moved more and more online, this is no longer the case. Instead, the consumer only needs to provide the data on the card: the card number, the expiration date, and the security code, and often also the name and billing address connected to the card. With all of this information stored online and no physical requirement, a bad actor need only collect the data via poorly-protected online sources to make fraudulent charges to the consumer's account. This causes financial and emotional distress to millions of consumers worldwide every year, as consumers must identify fraudulent charges, dispute charges with the financial institution backing the credit card, and replace credit cards in attempt to keep financial information secure.

While many large online marketplaces take significant precautions to protect consumer financial data, both for legal and consumer confidence reasons, no database is perfectly immune to hackers. Smaller online companies, which may not have the resources of Amazon™ or Google™, may not be able to implement all of the same security protocols. However, these companies may offer products or services not covered by larger competitors, or can appeal to consumers who prefer to support smaller businesses. However, consumers are often nervous about providing electronic payment information to unfamiliar companies, out of reasonable concern that the payment information may not be adequately protected.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A financial institution may offer consumers the ability to generate VCNs for recurring payments for online merchant services, and, using a determined active duration time and the billing cycle for the service determined, configure the VCN to deactivate. After deactivating the VCN, the financial institution may then block all future charges to the VCN, preventing those charges from ever reaching the consumer account.

In one aspect, the billing cycle may be determined by using a machine learning model. In another aspect, consumers can specify the active duration time for the VCN, with the VCN configured to be deactivated based on the consumer-specified time and the billing cycle for the merchant.

Other aspects provide for notifying the user based on upcoming or current status change of the VCN, including notifications based on the scheduled deactivation, the deactivation, and incoming charges to the VCN after deactivation. One aspect may also provide for the re-activation of the VCN based on the notification.

One aspect provides for providing a chat box to the user, in which the user may provide configuration information for the VCN. Another aspect may provide for the user specifying the name of a show and the financial institution determining the deactivation date of the VCN based on the show schedule and the billing cycle of the merchant providing the show. Aspects may also include determining the show schedule and reminding the user to reactivate for upcoming seasons of the show.

One aspect may provide for the user to specify the number of billing cycles the VCN should be active for and determining the deactivation date based on the number of active billing cycles and the billing cycle length.

One aspect may provide for determining whether the user is eligible for a trial period for a service. Another aspect may provide for determining the length of the trial period for a merchant based on incoming charge data from the merchant and using the trial period length to determine the deactivation date for the VCN.

One aspect may provide for determining that a merchant offers multiple billing cycle lengths for a service. Another aspect may provide for determining which billing cycle should be used to determine the VCN deactivation date. Further aspects may provide for blocking charges to the VCN based on the billing cycle corresponding to the incoming charge exceeding the active duration time.

Other aspects may provide for using the active duration time and the billing cycle to determine the VCN expiration date, where an expired VCN blocks all incoming charges. One aspect may provide for using the trial length as well as the active duration and the billing cycle to determine the VCN expiration date. Another aspect may provide for determining a starting number of billing cycles in which a VCN remains active and, based on the starting number of billing cycles and the billing cycle length, setting the VCN expiration date.

One aspect may provide for determining a VCN expiration date based on the date of the first charge to a VCN and a starting number of billing cycles.

One aspect may provide for determining a starting amount of money which may be charged to a VCN, decrementing the starting amount of money by an amount of an incoming charge, and deactivating the VCN when the remaining amount of money is less than the value of an incoming charge.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited to the accompanying figures in which like reference numerals indicate similar elements and in which.

DETAILED DESCRIPTION

Figure 1:
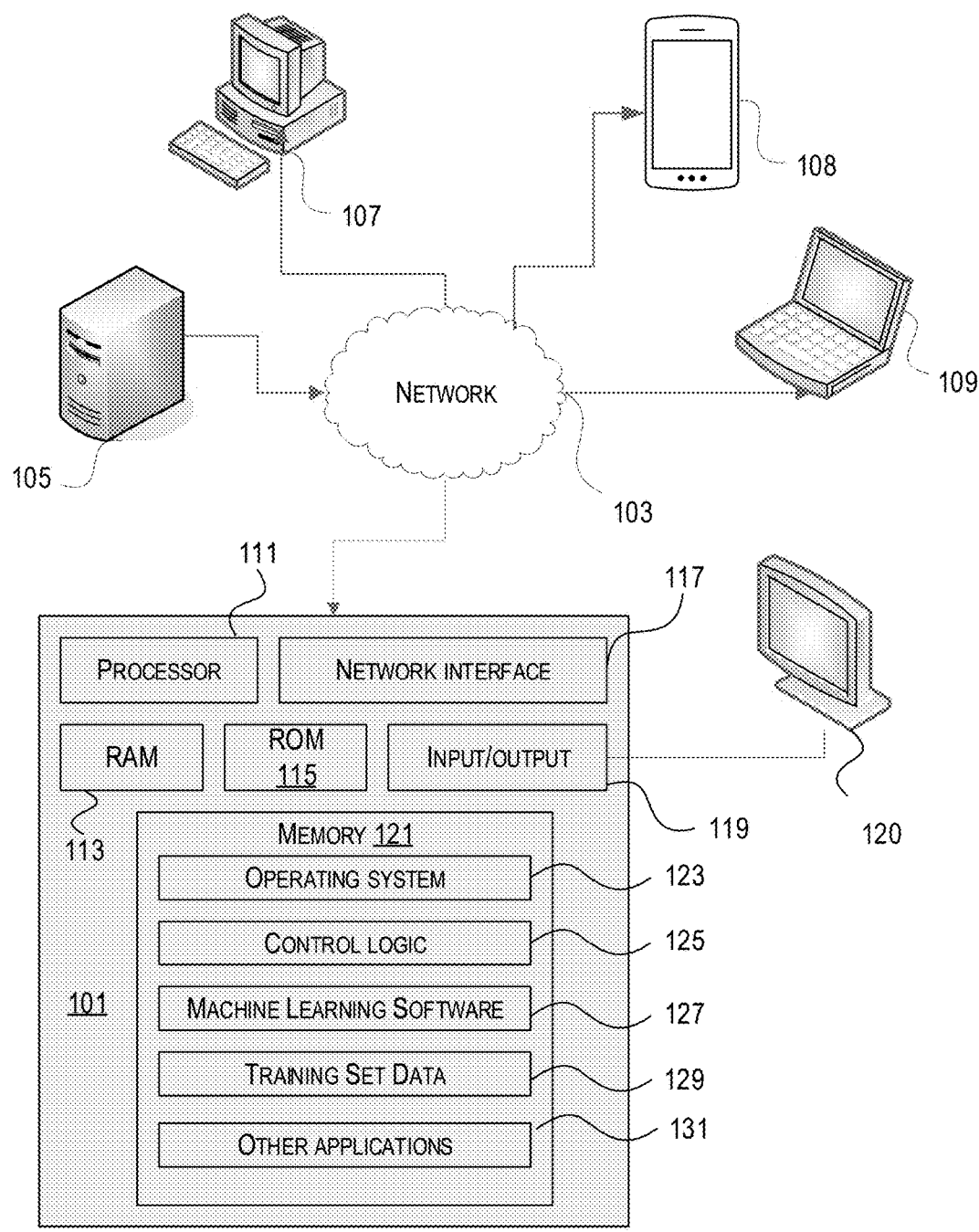
FIG. 1 depicts an example of a computing device that may be used in implementing one or more aspects of the disclosure in accordance with one or more illustrative aspects discussed herein.

In the following description of the various aspects, reference is made to the accompanying drawings, which form a part hereof, and in which is shown by way of illustration various aspects in which aspects of the disclosure may be practiced. It is to be understood that other aspects may be utilized and structural and functional modifications may be made without departing from the scope of the present disclosure. Aspects of the disclosure are capable of other aspects and of being practiced or being carried out in various ways. Also, it is to be understood that the phraseology and terminology used herein are for the purpose of illustration and should not be regarded as limiting. Rather, the phrases and terms used herein are to be given their broadest interpretation and meaning.

Credit card fraud and identity theft have been growing concerns for consumers. Routinely, data breaches have occurred at merchants and service providers where customer information has been exposed and potentially accessible to third party hackers. Merchants collect consumer personal information including address, phone numbers, credit card numbers and the like. The more information stored in a merchant database makes customers vulnerable to identity theft and cyber fraud. The merchants and/or service providers have been unable as a group to prevent these dangerous leaks of confidential customer information. The ability to prevent such risks of exposing such information would be a great benefit to consumer and merchant/service provider alike. Providing an electronic payment method that would minimize such risks would be welcomed.

Consumers making online purchases and enrolling in online merchant services are often wary of providing electronic payment information, out of security concerns or worries about repeated, unwanted charges. In these situations, virtual card numbers (VCNs) may be valuable. A VCN, as suggested by the name, is a credit card that is purely virtual, i.e., no physical card exists. Instead, the credit card number, expiration date, and security code are generated and used to make a payment to the merchant. As far as the merchant is concerned, a VCN behaves like any other card. However, the financial institution generating the VCN internally connects the VCN back to the consumer's electronic payment method, allowing charges made to the VCN to be routed back to the consumer's electronic payment method without ever exposing the electronic payment method information to the merchant. For further security, the VCN may even be generated for one-time use. After being used to make a purchase, the VCN may be deactivated, preventing any further charges from being made using the VCN.

A one-time VCN may allow a consumer to complete an online purchase knowing that, even if the VCN is stolen, the consumer's financial information is safe. The financial institution, knowing that the VCN has already been deactivated, can automatically block any future charges made to the VCN, including any fraudulent charges. By contrast, if the consumer had provided a primary electronic payment method, which the consumer may be using on a daily basis, and which was later stolen, the consumer would likely be subject to a great deal of emotional and financial distress.

Even if the VCN is not deactivated after a single use, it can still provide additional security benefits. A consumer may dedicate one VCN to a single merchant, for example, and in the case of a breach at that merchant, can simply disable the existing VCN to prevent any fraudulent charges. The consumer can even then create a second, brand new VCN for that merchant, and only has to replace electronic payment information at one merchant and not multiple merchants. This gives the consumer more peace of mind and more confidence in the financial institution that can provide this option.

At the same time, VCNs may be especially useful for merchants that offer recurring services or long-term payments. These services might include streaming media subscriptions, such as HBO Max™, food delivery services like HelloFresh™ or Grubhub™, gym memberships, or even third-party payment systems that allow consumers to break up a purchase into multiple smaller payments like Klarna™ or Afterpay™. Recurring services are especially common in the media streaming space, which dominates how many consumers access movies, TV shows, and entertainment. Rather than purchase individual movies or shows, many consumers pay for a recurring subscription for the right to access material within that merchant's online catalog. In fact, many consumers maintain multiple media subscriptions at the same time, making monthly or annual payments for the right to access a wide range of entertainment.

From the merchant perspective, this system is very convenient. While many merchants offer free or reduced-price trials to access content for the first time, merchants often require that consumers provide an electronic payment method at the beginning of the trial, to be charged automatically at the end of the trial. After this, the merchant will continue to charge the electronic payment at the end of each subsequent billing cycle—or, the time between charges for the merchant service—even if the consumer does not make use of the service.

In these cases, a VCN may be useful to a consumer who wishes to deactivate a service and wants to ensure that the merchant cannot further charge the consumer account after deactivation. If the consumer provides a VCN to a merchant, then later deactivates the consumer account at that merchant, the consumer can also deactivate the VCN, thus blocking any future charges the merchant generates. VCNs may also be useful for consumers that wish to enroll in a free trial, but have not yet committed to paying full price for the service. By deactivating the VCN before the first charge, the consumer can safely enjoy the trial period without worrying about remembering to deactivate the service before the trial ends. If the consumer does decide to enroll in the service, the consumer can easily keep the VCN active or generate a new VCN to pay for the service.

Similarly, the consumer could activate a VCN for a few months while using the merchant service, then deactivate the VCN when the consumer is done using the service. This can also save the consumer the headache of cancelling an account at the merchant, which can be very difficult and require multiple hours of phone calls, emails, and energy to successfully close the account.

VCNs can also be beneficial for the institution offering VCN generation, for the same reasons as for consumers. If a primary electronic payment method for a consumer is stolen and used fraudulently, the financial institution may still be required to pay the merchants which provided goods and services and were paid using that electronic payment method. Even if the financial institution or the consumer realizes that the primary electronic method has been stolen or lost and freezes the card, there may still be fraudulent charges on the card from before the card was frozen. Financial institutions may have to pay for additional monitoring on the electronic payment method to ensure that the payment method is not used fraudulently again. By contrast, a one-time VCN allows the financial institution to block all charges to that VCN including, of course, any potential fraudulent charges. If the consumer reuses the same VCN, but only for payments at one merchant, and that merchant suffers a breach, the financial institution may be able to deactivate all of the VCNs associated with that merchant before any fraudulent charges are made. This saves the financial institution money, by avoiding both fraudulent charges and time handling consumer disputes for those fraudulent charges. Implementing a technical system using a VCN card that would be useable for a single recurring service or single merchant would be great benefit to consumer and merchant alike.

A financial institution that offers VCN management, therefore, may attract consumers who enjoy having more secure online transactions and more control over individual payments for automatically recurring services. However, this process does require a lot of manual VCN management by the consumer, which may discourage consumers who are unfamiliar with VCNs from taking advantage of the opportunities. Financial institutions that can offer easy VCN generation, and more automation around VCN management, can encourage VCN use by more consumers, and therefore protect both the financial institution and consumer financial accounts in the process. A financial institution may comprise a bank, traditionally offering credit and debit cards to consumers, or other institutions responsible for maintaining a financial payment system such as cryptocurrencies, credit unions, payment processors, and more.

A financial institution offering VCN generation and management could improve this service even more if the institution could sync the deactivation dates of the VCN with the billing cycle for a merchant service. This would reduce the effort for the consumer creating the VCN, as the consumer does not need to remember to deactivate the VCN after a given period of time, nor does the consumer need to calculate the exact date that the VCN should be deactivated on. Rather, the consumer could provide a length of time or number of charges that the VCN should be active for, and the institution determines the deactivation date based on the user specified active period and on the length of the billing cycle of that merchant. The financial institution could even provide a default active duration based on the billing cycle to save the consumer the effort of determining the active duration.

Determining the length of the billing cycle for a given merchant is difficult for a financial institution, as merchants do not typically provide that information to financial institutions. Instead, the financial institution must either determine the length of the billing cycle based on data that the institution can scrape from the merchant website, or by calculating the length based on incoming charges from that merchant.

Incoming charges are difficult to work with for two reasons. First, merchants are not identified on charges in a standardized way, with the merchant identifier often varying based on type of service, location, user account, or even with a unique identifier for every charge. Second, charges are not typically identified with the exact product or service being purchased, requiring the financial information to analyze the charge to determine that any single charge is associated with a recurring payment rather than a one-off purchase.

For certain merchants that exclusively or near-exclusively offer recurring services, such as Spotify™, this analysis may be easier. For example, Spotify™ offers only one paid service, Spotify Premium™, at only one listed price, and is always billed per month. A trained model that can identify all incoming charges from Spotify™ can determine that these charges are always sent on the same (or close to same) day of each month for each user, and therefore conclude that the billing cycle is one month. However, this process requires identifying and analyzing charges across thousands of users and tens of thousands of charges to determine the billing cycle length. Other merchants may offer multiple services, services that are available on multiple billing cycles, or services with multiple paid tiers, which makes this process even more difficult by requiring a model to identify which charges are for which service before determining the length of the billing cycle. To further complicate matters, some merchants, such as Amazon™, may simultaneously offer one-off purchases and recurring services, requiring the model to not only differentiate between merchants, but be able to predict which charges from the same merchant are for a recurring service and which are not. However, being able to make this calculation could encourage consumers to adopt VCNs for recurring online transactions, as it reduces the manual work required from the consumer to deactivate the VCN when the consumer is done using the service.

For financial institutions offering VCNs, the process of determining the billing cycle for a particular merchant may be easier if the consumer base has already widely adopted VCNs and uses one VCN per merchant. In this scenario, the financial institution could more easily narrow down which incoming charges are from which merchants by using consumer-provided information to tie incoming charges to one VCN to a specific merchant.

A similar dilemma faces a financial institution trying to predict trial length. Trial lengths are displayed to consumers enrolling in trials, but are not typically shared with financial institutions. Instead, the financial institution would have to collect that information independently, either by scraping the merchant website or by calculating the time between pre-authorizations, sent by the merchant to confirm that the electronic payment method is real, and the first charge to the electronic payment method. However, again, being able to provide this information to consumers generating VCNs would be extremely valuable, as the financial institution can automatically factor the trial length into the amount of the time that the consumer specifies the VCN should remain active. For example, a consumer who enrolls in a trial for a service and wishes to be charged for the service for two months would expect that the two month period begins on the same date as the first charge for the service. Specifically, the first charge would be the day after the trial ends.

Aspects discussed herein may relate to methods and techniques for detecting that a user has begun a trial for a service offered by a merchant, providing the user with the option to block charges from that merchant, identifying the merchant based on the information within the incoming charge data, and blocking charges from the merchant at request of the user.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some aspects, implement one or more aspects of the disclosure by reading and/or executing instructions and performing one or more actions based on the instructions. In some aspects, computing device 101 may represent, be incorporated in, and/or include various devices such as a desktop computer, a computer server, a mobile device (e.g., a laptop computer, a tablet computer, a smartphone, any other types of mobile computing devices, and the like), and/or any other type of data processing device.

Computing device 101 may, in some aspects, operate in a standalone environment. In other aspects, computing device 101 may operate in a networked environment. As shown in FIG. 1, various network nodes 101, 105, 107, 108, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 108, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces (I/O) 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other aspects, computing device 101 may include two or more of any and/or all of these components (e.g., two or more processors, two or more memories, etc.) and/or other components and/or subsystems not illustrated here.

Devices 105, 107, 108, 109 may have similar or different architecture as described with respect to computing device 101. Those of skill in the art will appreciate that the functionality of computing device 101 (or device 105, 107, 108, 109) as described herein may be spread across multiple data processing devices, for example, to distribute processing load across multiple computers, to segregate transactions based on geographic location, user access level, quality of service (QoS), etc. For example, devices 101, 105, 107, 108, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various aspects. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
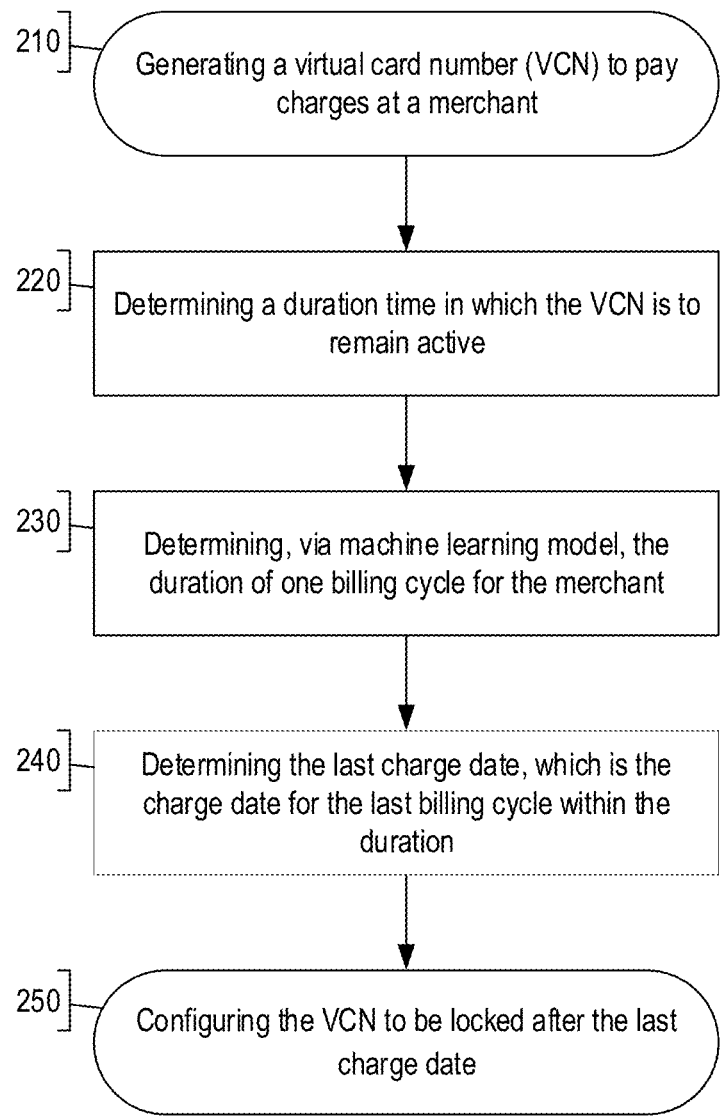
FIG. 2 is an illustrative flowchart representation of the process of generating a VCN and configuring the VCN to be disabled after a user specified period of time according to illustrative aspects of the disclosure.

FIG. 2 is an illustrative flowchart representation of the process of generating a VCN and configuring the VCN to be disabled after a user specified period of time. Specific aspects of this process will be discussed in FIG. 3.

In step 210, the financial institution may generate a VCN at request of the user for the purpose of paying recurring charges for a service provided by an online merchant. The user may be accessing the service via an Internet-compatible device such as devices 101, 107, 108, and 109 from FIG. 1, where the website is accessed over a network similar to network 103. One particular aspect for this step, where the financial institution provides the VCN generation service through a browser extension while the user is accessing the merchant website, will be discussed further in FIG. 3 and FIG. 6. In another aspect, the user may request the generation of a VCN without the immediate intent to pay for a good or service with the VCN.

In step 220, the financial institution may receive the specified active duration time for the VCN from the user. This active duration time may be received through user interaction in various different ways, including, but not limited to, a datepicker, a time selector allowing the user to input a number and select a unit of time such as days/weeks/months, and more. In another aspect, the user may provide the number of times that the user wishes the VCN to be charged before being deactivated, such as "2", or "twice". In another aspect, the financial institution may provide a chat box for the user to enter in the specified time and other configuration options in natural language. In this aspect, the user specified time may initially comprise a message such as "charge me for two months" or "charge me twice", or other natural language ways for specifying a period of time. This aspect will be discussed further in FIG. 7.

In step 230, the financial institution may determine the length of the billing cycle for the merchant for which the user is generating the VCN. In some aspects, identifying the merchant from this user interaction may include scraping the merchant website to determine the identity of the merchant. In other aspects, the user may provide the identity of the merchant as part of the VCN configuration. The financial institution may then retrieve the billing cycle length for the merchant, which may be determined via a machine learning model analyzing incoming charge data from the merchant to other users with electronic payment methods maintained by the same financial institution. This machine learning model may be similar to machine learning model 127 from FIG. 1 and trained using a training set similar to training set data 129. The process of training the machine learning model to determine the billing cycle length will be discussed further in FIG. 10.

In some aspects, the billing cycle length prediction model may be used to generate a database, similar to computing device 101 and 105 and accessible via network 103, to store determined billing cycles and the associated merchants. In this aspect, determining the length of the billing cycle may comprise retrieving the billing cycle length associated with the merchant from the database built by the billing cycle length prediction model.

In other aspects, the financial institution may also determine if the user is eligible for a trial period before the first charge date. In these aspects, the financial institution may determine that the user is eligible for a trial through various ways, including, but not limited to, determining that the user is eligible based on not receiving charges from the merchant for the service before, scraping the website to determine that the user is currently enrolled in a trial, and other methods.

In these aspects, the financial institution may also determine the length of the trial for the merchant service as well as the billing cycle length. Methods of determining the trial length for the merchant service may be similar to those available for determining the billing cycle length. These methods may include, but are not limited to, scraping the merchant website for information on the length or end date of the trial, analyzing the time between pre-authorizations and the first charge for the merchant based on incoming pre-authorizations and charges for other users paying for the service via an electronic payment method maintained by the financial institution, and more.

In another aspect, the user may provide information about the billing cycle and trial length via a chat box. This aspect will be discussed further in FIG. 7.

In step 240, the financial institution may calculate the last charge date, where the last charge date is a date that the VCN is scheduled to be charged for the last billing cycle within the user specified duration of time. For example, if the user generated the VCN on March $1^{st}$, specified that the VCN should remain active for three months, and the billing cycle length was one month, the last charge date would be May Pt. In this example, the VCN would be charged on March $1^{st}$ for the month of March, April $1^{st}$ for the month of April, and May $1^{st}$ for the month of May, which would grant the user three months of access to the merchant service.

In step 250, the financial institution may configure the VCN to be deactivated after the last charge date, where a deactivated VCN blocks all incoming charges. Continuing with the example, this would comprise configuring a VCN generated on March $1^{st}$ for an active period of three months and for a merchant service with a billing cycle length of one month to be deactivated after May $1^{st}$. This would grant the user three months of the service and prevent the merchant from charging the user for a fourth month of service on June $1^{st}$, where a successful charge on June $1^{st}$ and subsequent payment would grant the user access to the service for the month of June. The financial institution may then store the VCN for later management and possible reactivation by the user. In one aspect, storing the VCN may entail saving the VCN to a database similar to database 103 from FIG. 1, where the VCN may be associated with the user account, a specific electronic payment method associated with the user, or in other ways.

Figure 3:
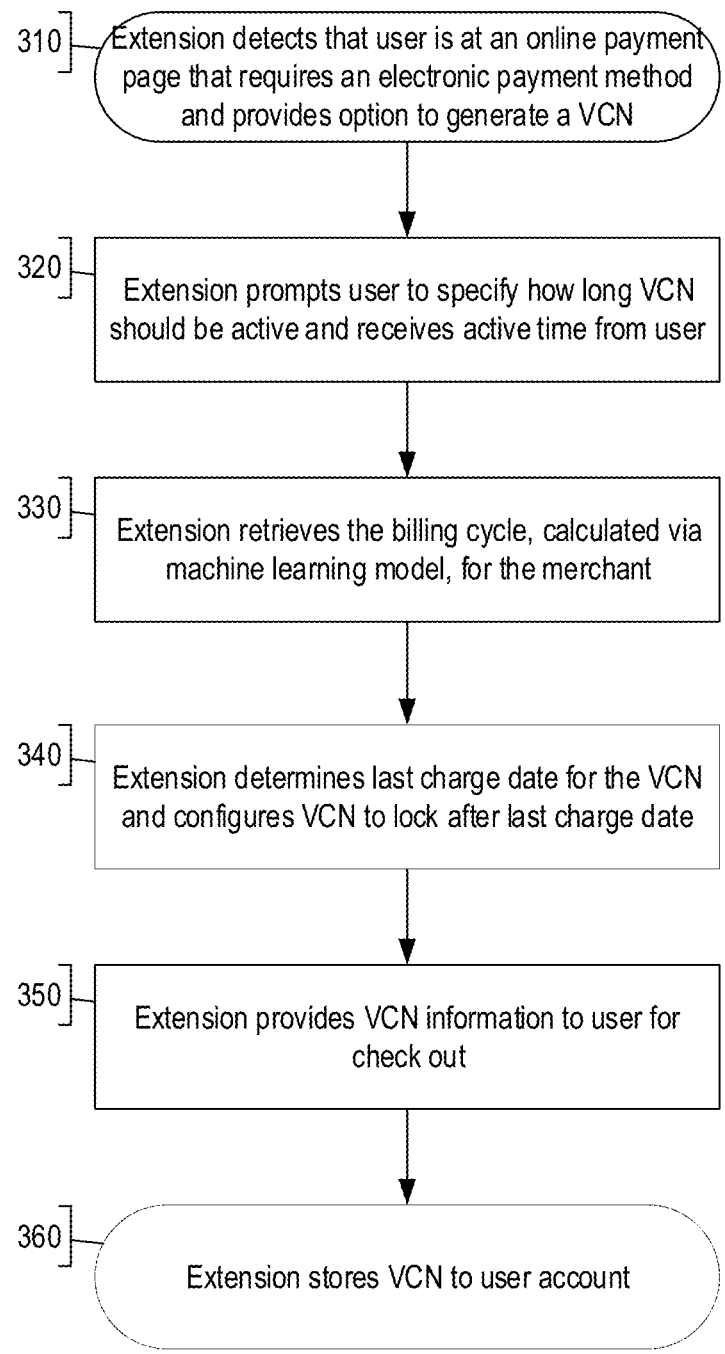
FIG. 3 is an illustrative flowchart of one implementation of FIG. 2, where the VCN is generated via browser extension that detects when the user is on an online payment page for a merchant according to illustrative aspects of the disclosure.

FIG. 3 is an illustrative flowchart of one aspect of FIG. 2, where the VCN may be generated via browser extension that detects when the user is on an online payment page for a merchant.

In step 310, a browser extension may detect that the user is at an online payment page for a merchant service, the browser extension may provide the user with the option to generate a VCN. In this aspect, the browser extension may determine that the user is in the process of checking out by scraping the website to determine that common electronic payment entry fields are present on the page. In this aspect, the browser may be a way for a user computing device similar to any of computing devices 101, 107, 108, and 109 to access other websites via network 103 from FIG. 1. The browser extension in this aspect may be provided and maintained by the financial institution for purposes comprising collecting information about the online activity of consumers, searching for discounts, checking security of websites, saving consumer electronic payment information to allow consumers to enter electronic payment information without typing the information manually, and more.

In alternate aspects, the financial institution may use a mobile application, running on user mobile device 108, to detect that the user is checking out on another mobile application or on a payment page in a mobile browser. In these aspects, the mobile application may determine that the user is accessing a payment process by collecting information from the mobile application or payment page providing the check out process. In these aspects, the option to generate a VCN may be provided to the user via a mobile notification.

In step 320, the browser extension may receive the active duration time from the VCN from the user. In this aspect, the browser extension may prompt the user to provide the active duration time. The browser extension may provide the user with the option to specify the active duration time in various ways, including, but not limited to, a date picker, a time selector, or other ways of inputting a time duration. In some aspects, the browser extension may provide a chat box for the user to interact with the financial institution and, via the chat box, provide the configuration information for the VCN. In these aspects, natural language processing may be used to extract the active duration time from the user messages.

In some aspects, the browser extension may open a chat box and prompt the user to specify the reason that the user is enrolling in the service. For example, in an aspect where the service is a media streaming service, the browser extension may detect that the merchant website is for a media streaming service and prompt the user to state whether the user is enrolling to watch a specific show and, if so, the name of the show that the user is watching. The browser extension may then retrieve the release schedule for that show and use the release date for the last episode in the current season to determine the active duration time for the VCN. In some aspects, the financial institution may perform this retrieval in advance by collecting the release schedules for popular shows and caching them for later retrieval by the browser extension. In other aspects, the browser extension may retrieve this information by requesting the information from the merchant or from other third-party services maintaining release schedule information. In this aspect, the financial institution may also ask if the user would like a reminder for future seasons for that show.

In step 330, the browser extension can receive the billing cycle for the merchant from the financial institution. In one aspect, the financial institution may calculate the billing cycles for merchants in advance, following steps similar to those in step 230 in FIG. 2. In this aspect, the browser extension may determine the identity of the merchant based on information obtained from the merchant website and uses the merchant identity to retrieve the billing cycle length from a pre-determined set. In this aspect, the browser extension would send a request back to the financial institution database, similar to database 105 from FIG. 1, over network 103 from FIG. 1, and the financial institution would send back a message containing the billing cycle length for that merchant. In other aspects, the browser extension may be designed to cache the billing cycles for merchants with frequent enrollments within the local installation of the browser extension. In these aspects, the local cache may be used to save time while retrieving the billing cycle by allowing the most frequent billing cycle retrievals to be completed without a network exchange.

In step 340, the browser extension may calculate the last charge date for the VCN, based on the specified active duration time and the billing cycle length, and may configure the VCN to be deactivated after the last charge date. This step may be similar to step 240 in FIG. 2.

In step 350, the browser extension can provide the VCN information to the user, so the user can complete enrollment in the merchant service. Finally, in step 360, the browser extension can store the VCN as associated with the user account. In some aspects, the browser extension may store the VCN information locally in the browser extension installation, so the user can access the VCN quickly. In other aspects, the browser extension may send the VCN information back to the financial institution so the VCN can be stored in a database with other account information associated with the user or the electronic payment method associated with the VCNs. The VCN may also be stored with the last charge date so it can be deactivated after the last charge date.

In some aspects, the VCN may be stored with a flag that indicates whether the VCN is active or not. In other aspects, the VCN may be stored with the last charge date, where the process of determining if the VCN is active comprises checking if the last charge date has passed. In other aspects, the financial institution may run a scheduled process over all stored VCNs to set a "DEACTIVATED" flag on VCNs that have recently passed the last charge date. In these aspects, the local browser extension may request regular updates on the status of the VCN from the financial institution, or may trigger a request for the updated VCN status based on the user accessing the browser extension.

Figure 4:
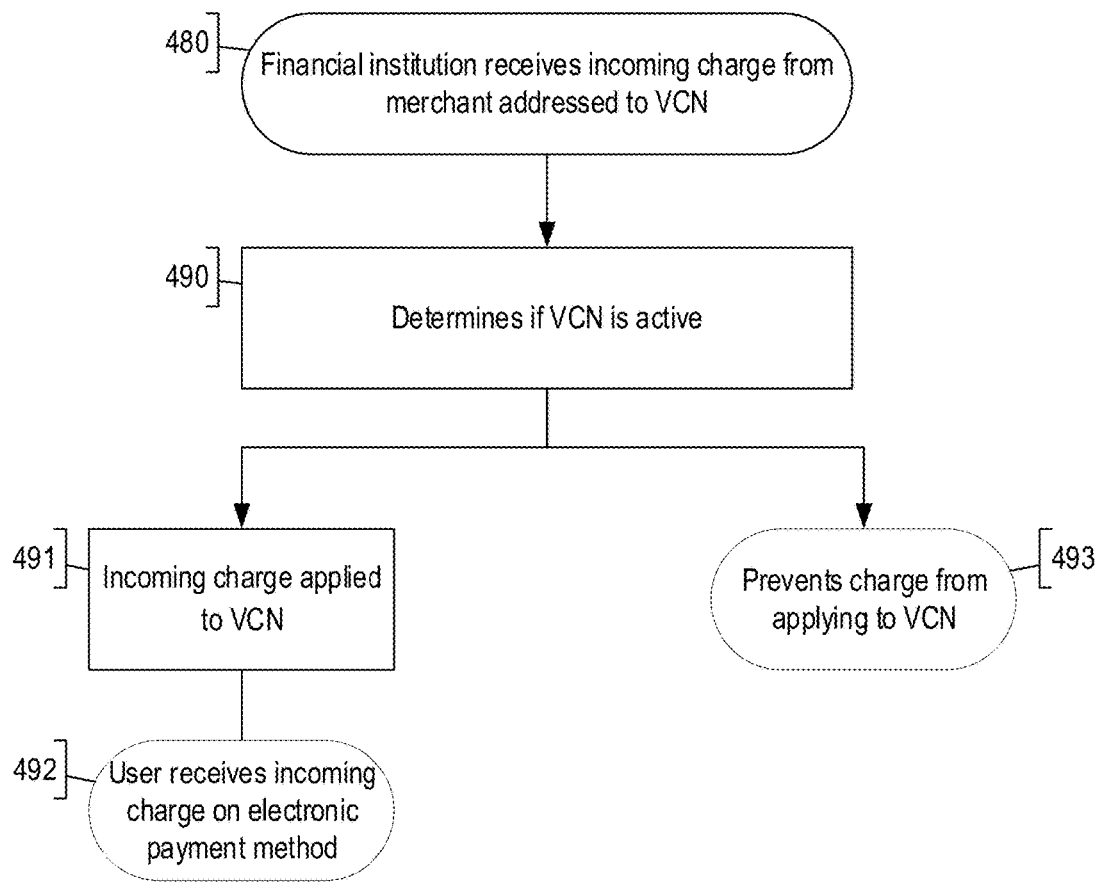
FIG. 4 is an illustrative flowchart of the financial institution receiving charges from the merchant to the VCN and either routing those charges to the consumer electronic payment method or blocking the charges if the VCN has been disabled according to illustrative aspects of the disclosure.

FIG. 4 is an illustrative flowchart of the financial institution receiving charges from the merchant to the VCN. Depending on whether the VCN has been deactivated, the financial institution may either rout the charges to the consumer electronic payment method or block the charges.

In step 480, the financial institution can receive an incoming charge from the merchant that is addressed to the VCN. In some aspects, this incoming charge may be structured according to ISO 8583, similar to other credit or debit card charges. In other aspects, the incoming charge may be structured according to any API that the financial institution is configured to receive for electronic payment methods.

In step 490, the financial institution can determine if the VCN is active. The process for determining if the VCN is active may vary based on implementation. In some aspects, determining if the VCN is active may comprise checking a flag on the VCN record in an internal database, similar to database 105 in FIG. 1, that indicates if the VCN is active. In another aspect, determining if the VCN is active may comprise checking the date on which the VCN is to be deactivated and determining if that date has passed. Other aspects may also be possible depending on how the VCN is stored.

If the VCN is active, the financial institution cam allow the incoming charge to be applied to the VCN in step 491, with the user receiving the charge on the electronic payment method that the VCN is associated with in step 492. If the VCN is deactivated, the financial institution can prevent the incoming charge from being applied to the VCN in step 493. In this case, the user may never see the incoming charge.

In another aspect, the financial institution may block the charge even if the VCN is still active if the value of the charge represents a longer billing cycle than the period for which the VCN is scheduled to be active. For example, if the VCN is scheduled to be deactivated in two months, but the incoming charge would pay for six months of access to the merchant service, the financial institution may block the charge as in step 491.

In other aspects, the financial institution may generate a notification to the user upon receiving the incoming charge and determine that the VCN is deactivated. In this aspect, the notification may inform the user that the VCN was deactivated and had received an incoming charge. In some aspects, the notification may also contain a user interactive element that would allow the user to re-activate the VCN and allow the incoming charge to be applied to the VCN. Potential aspects for notifications will be discussed further in FIGS. 5 and 8.

Figure 5:
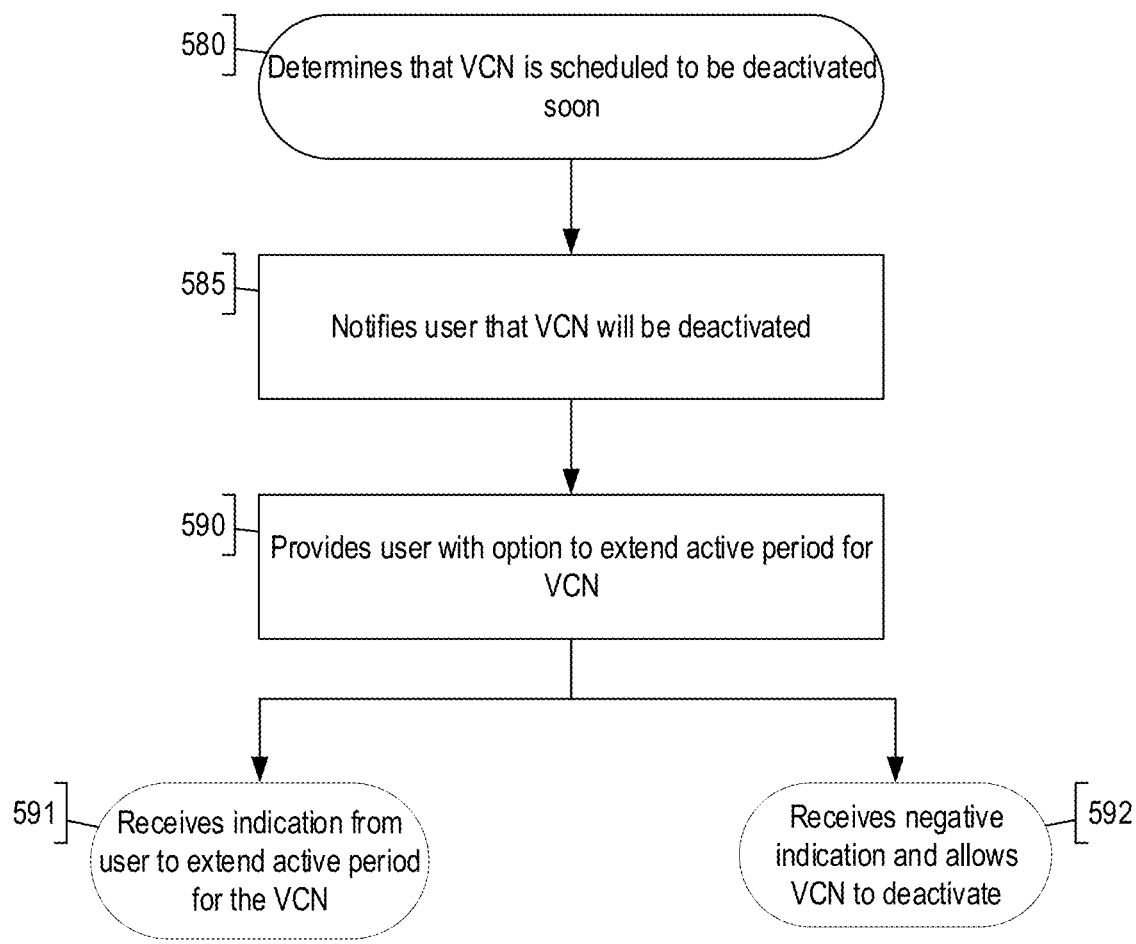
FIG. 5 is an illustrative flowchart of the financial institution determining that the VCN is set to be deactivated and notifying the user according to illustrative aspects of the disclosure.

FIG. 5 is an illustrative flowchart of one aspect in which the financial institution sends a notification to the user regarding the state of the VCN. In FIG. 5, the financial institution may send a notification to the user upon determining that the VCN is set to be deactivated soon.

In step 580, the financial institution can determine that the VCN is scheduled to be deactivated soon. In one aspect, the financial institution may determine this by running a regular process over all VCNs and generating notifications for those that are to be deactivated within a predetermined period of time, such as one week. In other aspects, the financial institution may adjust the length of time between when the financial institution generates the notification based on the billing cycle of the merchant service for which the VCN is being used. In other aspects, the financial institution may also send the notification multiple times at different intervals prior to deactivation.

In step 585, the financial institution can send the notification of the scheduled deactivation of the VCN to the user. This notification may be generated in multiple ways, including, but not limited to, a mobile notification generated by an app on a smartphone similar to device 108 that is operated by the user, an email, a text message, or other communications protocols. These notifications may be generated at a central database maintained by the financial institution, such as database 105 in FIG. 1, and sent to computing devices such as devices 107, 108, or 109 which are operated by the user. In some aspects, the financial institution may also generate paper or phone notifications.

In step 590, the financial institution can provide the user with the option to extend the active period for the VCN. In one aspect, this may be a user interactive element within the body of a message or mobile notification sent to the user. In other aspects, the financial institution may send a message to the user and provide the user with a list of predetermined options to indicate whether the user wishes for the VCN active period to be extended. For example, in an aspect where the financial institution sent the user a text message, the financial institution may indicate that the user can respond "YES" or "NO" to extend the active period for the VCN. The financial institution may receive the decision of the user in various ways, including, but not limited to, an API request generated by the user selecting the element to extend the active period from a user device and which is received at a computing device managed by the financial institution such as devices 101 or 105 over network 103, an email received by a computing device, a text message, or other methods.

In step 591, following a response from the user indicating that the user wishes to extend the active period, the financial institution may extend the active period of the VCN. In one aspect, the financial institution may provide the user with the ability to specify the amount of time to extend the VCN, and then configure the VCN to deactivate after that newly specified period of time. In other aspects, the financial institution may set a default extension period, such as one billing cycle.

In step 592, following a response from the user indicating that the user does not wish to extend the active period, the financial institution may allow the VCN to deactivate on schedule. In some aspects, the financial institution may also interpret a lack of response from the user as an indication that the user wishes for the VCN to be deactivated on the current schedule.

Steps 580-592 may also be used for other notifications triggered by approaching changes in status or incoming charges to the VCN. In one aspect, for example, the financial institution may also generate notifications based on the deactivation of the VCN, as a way of confirming with the user that the VCN should be deactivated. In another aspect, the financial institution may generate notifications based on receiving incoming charges to the VCN after the VCN has already been deactivated. In this aspect, the financial institution may also remind the user to close the user account for the merchant service to stop receiving charges. In another aspect, where the financial institution may track a specific show that the user accesses via a streaming media service, the financial institution may also generate notifications upon determining that a new season of the show is to be released soon. In another aspect, the financial institution may send a notification upon reaching the end of a free or reduced-price trial period. These are only some examples of potential triggers for notifications regarding the VCN and is not an exclusive list of all triggers.

Figure 6:
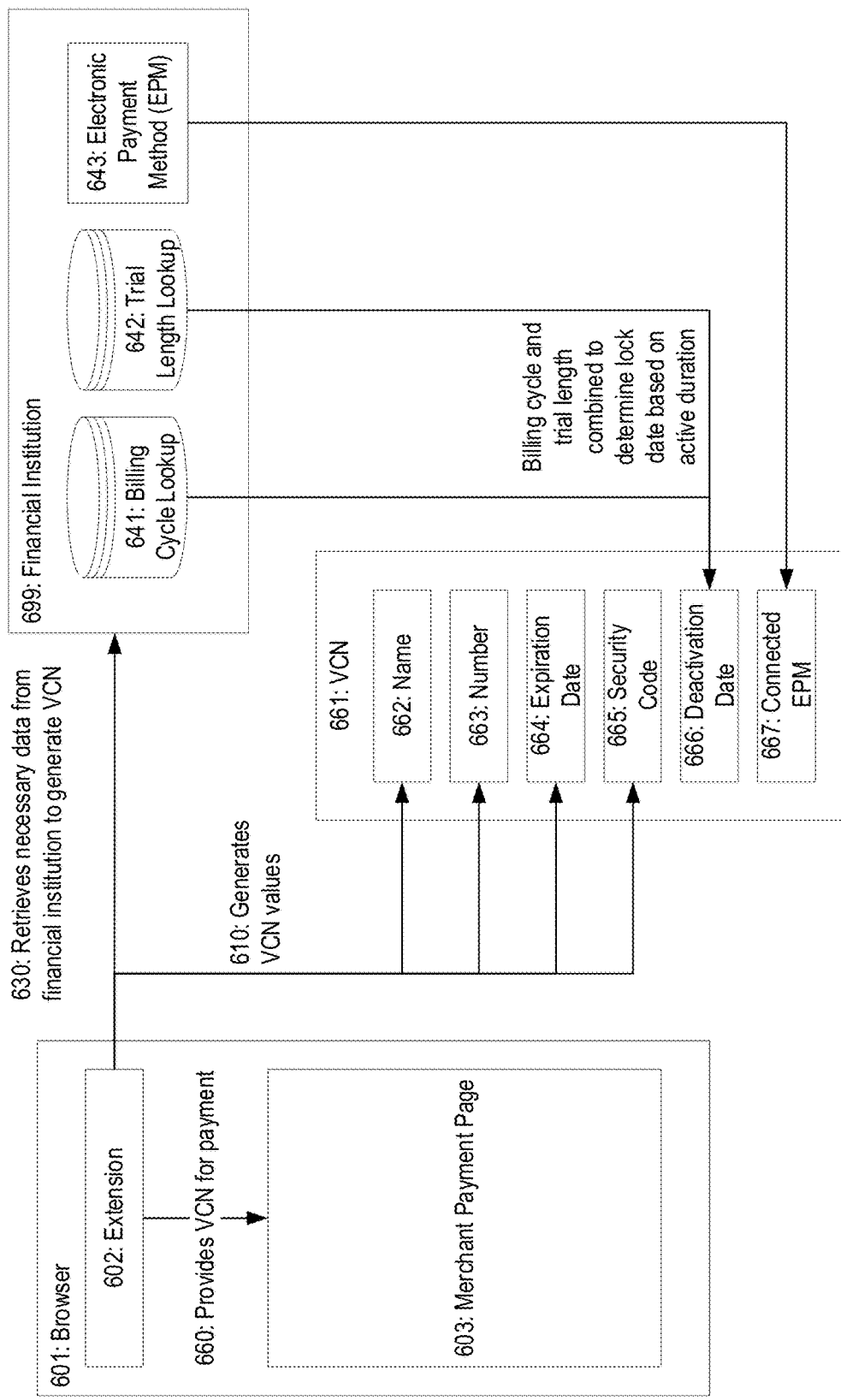
FIG. 6 depicts an implementation where a browser extension generates a VCN for the user based on the user specified time and the billing cycle and trial length for the merchant according to illustrative aspects of the disclosure.

FIG. 6 depicts an aspect where a browser extension can generate a VCN for the user based on the user specified time and the billing cycle and trial length for the merchant service, similar to steps 210-260 from FIG. 2 or steps 320-350 from FIG. 3. In this aspect, the VCN generation process may be performed by a browser extension 602, which can be maintained by the financial institution 699, and which can run on a browser 601 on a user device similar to devices 101, 107, or 108 from FIG. 1.

In step 610, the browser extension 602 can generate values for the VCN 611. These values may comprise a name 662 for the VCN, for later reference, a number 663, an expiration date 664, and a security code 665. In other aspects, the user may provide one or more of these values. For example, the browser extension 601 may generate the entire VCN 661 and then give the user the option to name the VCN 661 with a user-readable name to make it easier to manage the VCN 661 in the future. In other aspects, the VCN 661 may not have a name 662 and be managed solely based on the number 663.

In step 630, browser extension 602 can retrieve the billing cycle, and, if applicable, the trial length from financial institution 699. This step is similar to step 230 in FIG. 2 and step 330 in FIG. 3. In this aspect, the billing cycle and trial length may be precalculated and saved in databases, here represented as billing cycle lookup 641 and trial length lookup 642. In another aspect, this information may be stored within one singular database. This database may be similar to database 105 from FIG. 1 and may receive information requests from the browser extension over network 103. In this aspect, the financial institution 699 may return the billing cycle length and trial length back to the browser extension for use in generating the VCN. The browser extension 602 may use the billing cycle length and trial length to determine, based on the user-specified active duration, the deactivation date 666 for the VCN 661. In other aspects, the billing cycle length and trial length for common merchants may be stored in the local installation of the browser extension 602 to save time while generating the VCN 661.

The browser extension 602 may also link the electronic payment method (EPM) 643 to the VCN as connected electronic payment method 667. In some aspects, the VCN 661 may be generated with a connected EPM 667. In other aspects, the VCN 661 may be linked to a user account, which has an electronic payment method 643, and incoming charges to the VCN 661 may be shown to the user as incoming charges against electronic payment method 643, without the VCN 661 and electronic payment method 643 being directly connected. In other aspects, the browser extension 602 may already have the user account or user electronic payment method 643 stored in the local installation for the browser extension 602, which allows the browser extension 602 to generate the VCN 661 based on that information without requesting the information from financial institution 699. This local caching may be done to save time while generating the VCN 661.

Having generated the VCN 661, in step 660, the browser extension 602 may provide the VCN 661 to the user for making the online payment on merchant payment page 603. In some aspects, the browser extension 602 may insert the VCN number 663, VCN expiration date 664, and VCN security code 665 into merchant payment page 603 according to the wishes of the user. In these aspects, the browser extension 602 may provide the user the option for the browser extension 602 to fill in the VCN information on the merchant payment page 603. In these aspects, the browser extension 602 may also store the user decision to allow the browser extension 602 to fill in payment information on merchant payment page 603 and follow that decision without requesting further user input in the future.

Figure 7:
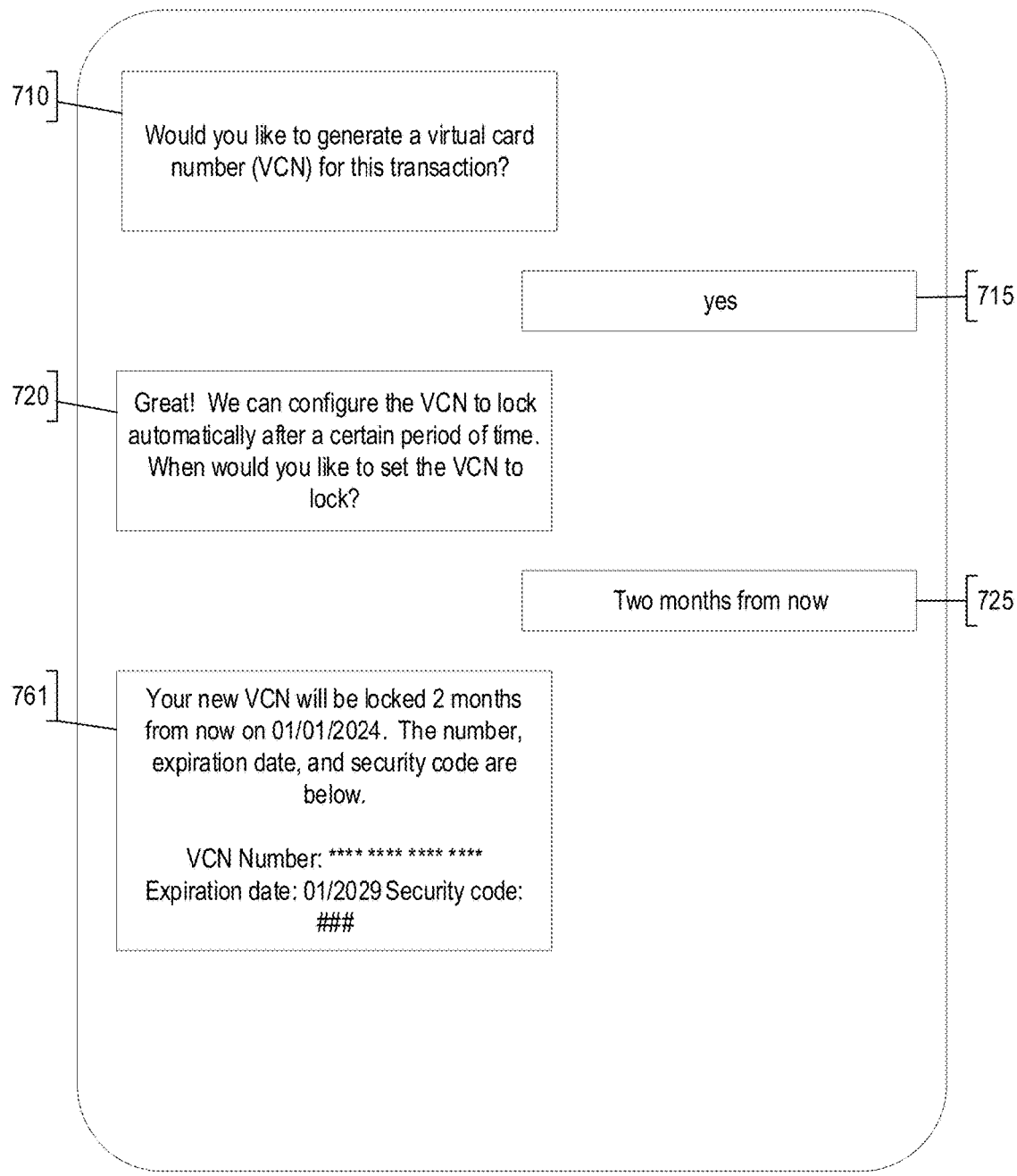
FIG. 7 depicts an implementation where the user enters into a dialogue or chat to generate and configure the VCN according to illustrative aspects of the disclosure.

FIG. 7 depicts an aspect where the user may enter into a dialogue or chat to generate and configure the VCN. In one version of this aspect, a browser extension, similar to browser extension 602 in FIG. 6 or the browser extension from the flowchart in FIG. 3, may provide a chat box 705 for the user to interact with and specify configuration information for the VCN. In other aspects, such as an aspect where the VCN may be generated from within a mobile application which is accessed by the user on a computing device similar to device 108 from FIG. 1, chat box 705 may be provided from within the mobile application. Messages within chat box 705 may be sent across network 103 from FIG. 1 between the user and another computing device, similar to devices 101, 105, 107, 108, or 109 on the financial institution side that is receiving the messages. In some aspects, another human, on behalf of the financial institution, may be operating the computing device and sending messages back to the user. In these aspects, the human receiving messages on behalf of the financial institution may trigger the VCN generation process based on information provided by the user. In other aspects, a computer program, running on a computing device similar to computing devices 101, 105, or 107, may be receiving the messages, processing those messages according to natural language processing algorithms, and generating responses based on the configuration of the computer program. In these aspects, the computer program may generate the VCN based on information provided from the user.

Message 710 may represent a step similar to step 210 from FIG. 2 or step 310 from FIG. 3, in which the user is provided with the option to generate a VCN for an online transaction. Message 715, sent by the user, may be interpreted by the financial institution as the user desiring to generate VCN.

Message 720 may represent a step similar to step 220 from FIG. 2 or step 320 from FIG. 3, in which the user is provided with the option to set the active duration time for the VCN. Message 725, sent by the user, contains the user-specified active duration. After receiving message 725, the recipient on behalf of the financial institution may trigger the VCN generation process, shown in more detail in FIGS. 2, 3, and 6.

In other aspects, the human or program responding to messages on behalf of the financial institution may continue the dialogue or chat to obtain more information about how the user wishes to configure the VCN, the purpose for the which the user is generating a VCN, and more. In one aspect, the recipient may ask if the user is generating the VCN for a streaming media subscription, similar to the aspect discussed in further detail in FIG. 2.

In message 761, the recipient can send the VCN information to the user, similar to step 360 in FIG. 3. The user may then use the VCN information to complete the online transaction.

Figure 8:
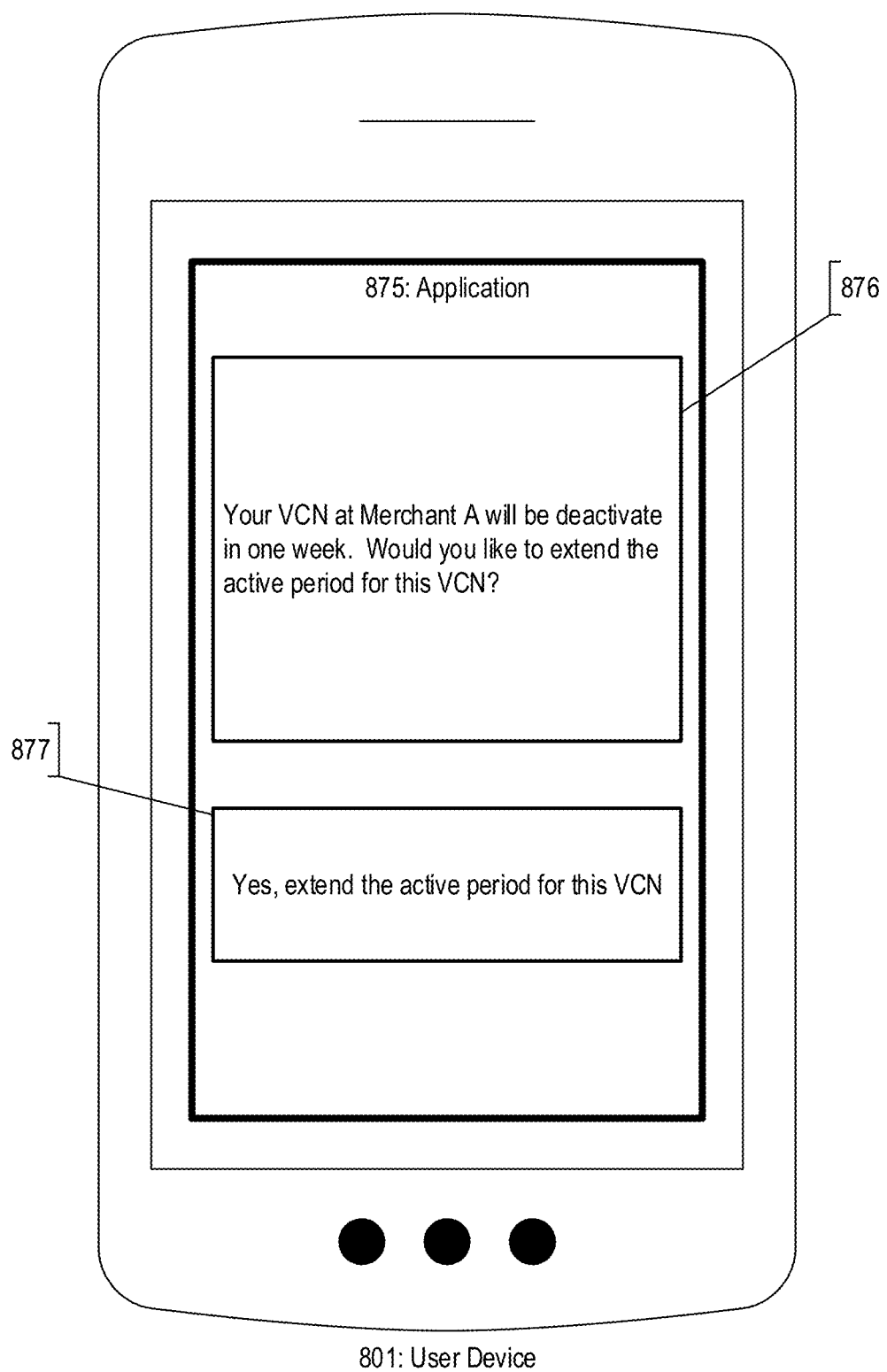
FIG. 8 depicts an example of a user device receiving a notification that the VCN is scheduled to be disabled per the user request according to illustrative aspects of the disclosure.

FIG. 8 depicts an aspect of a user device receiving a notification that the VCN can be scheduled to be deactivated per the user request. This notification may be similar to the notification discussed in FIG. 5. The user device 801 may be a computing device operated by the user similar to computing devices 107, 108, or 109 from FIG. 1.

In this aspect, the user device 801 is operated by the user and has an application 875 installed thereon. Application 875 may be an application used by the user to access a financial account at the financial institution, and application 875 may be maintained by the financial institution for that purpose.

Similar to step 580 in FIG. 5, the financial institution can determine that the VCN is scheduled to be deactivated soon. In this aspect, the financial institution has determined that the VCN is scheduled to be deactivated in one week. In other aspects, the financial institution may generate notifications at different time intervals prior to deactivation, up to and including the date of deactivation. The notification may be generated from a central database maintained by the financial institution, such as computing device 105 from FIG. 1, and sent over the network 103 to a user device such as 107, 108, or 109, or the notification may be generated from within a user device 107, 108, or 109 by a local installation of an application maintained by the financial institution.

In the aspect depicted in FIG. 8, after determining that the VCN is scheduled to be deactivated, the application 875 on user device 801 can generate a notification informing the user of the scheduled deactivation. In this aspect, the notification is a mobile notification generated by an application installed in the user device similar to computing device 108 from FIG. 1. Notification 876 may be similar to the notification in step 585 in FIG. 5.

User interactive element 877 can provide the user with the ability to extend the active period of the VCN, similar to the option presented to the user in step 590 in FIG. 5. In this aspect, notification 876 and user interactive element 877 may be presented to the user at the same time. If the user interacts with user interactive element 877, application 875 may interpret that interaction as the user wishing to extend the length of the active duration time for the VCN, similar to step 591 in FIG. 5. If the user does not interact with user interactive element 877, application 875 may interpret the lack of interaction as the user wishing to allow the VCN to be deactivated on schedule, similar to step 592 in FIG. 5.

In another aspect, application 875 may also provide a second user interactive element, which may allow the user to send an explicit instruction to application 875 that the VCN should be deactivated on the current schedule. In still other aspects, user interactive element 877 may direct the user to a configuration location within application 875, from which the user may choose if the VCN active duration time should be extended and by how much. In some aspects, application 875 may automatically extend the duration by one billing cycle length if the user indicates that the active duration time should be expanded, but does not provide an explicit time duration by which to extend the active duration time.

The notification aspect depicted in FIG. 8 may also be applied to notifications triggered by other VCN status updates including, but not limited to, incoming charges received to the VCN while the VCN is active or incoming charges received after the VCN has been deactivated. In other aspects, notifications may be triggered for changes related to the merchant service itself. For example, if the user watches a particular show and has indicated to the financial institution that the user would like reminders before the return of the show, the financial institution may trigger a notification when the show is scheduled to return. In this aspect, the notification may comprise reminders regarding reactivating the VCN. Notifications triggered by other changes in the merchant service may also be possible.

Figure 9:
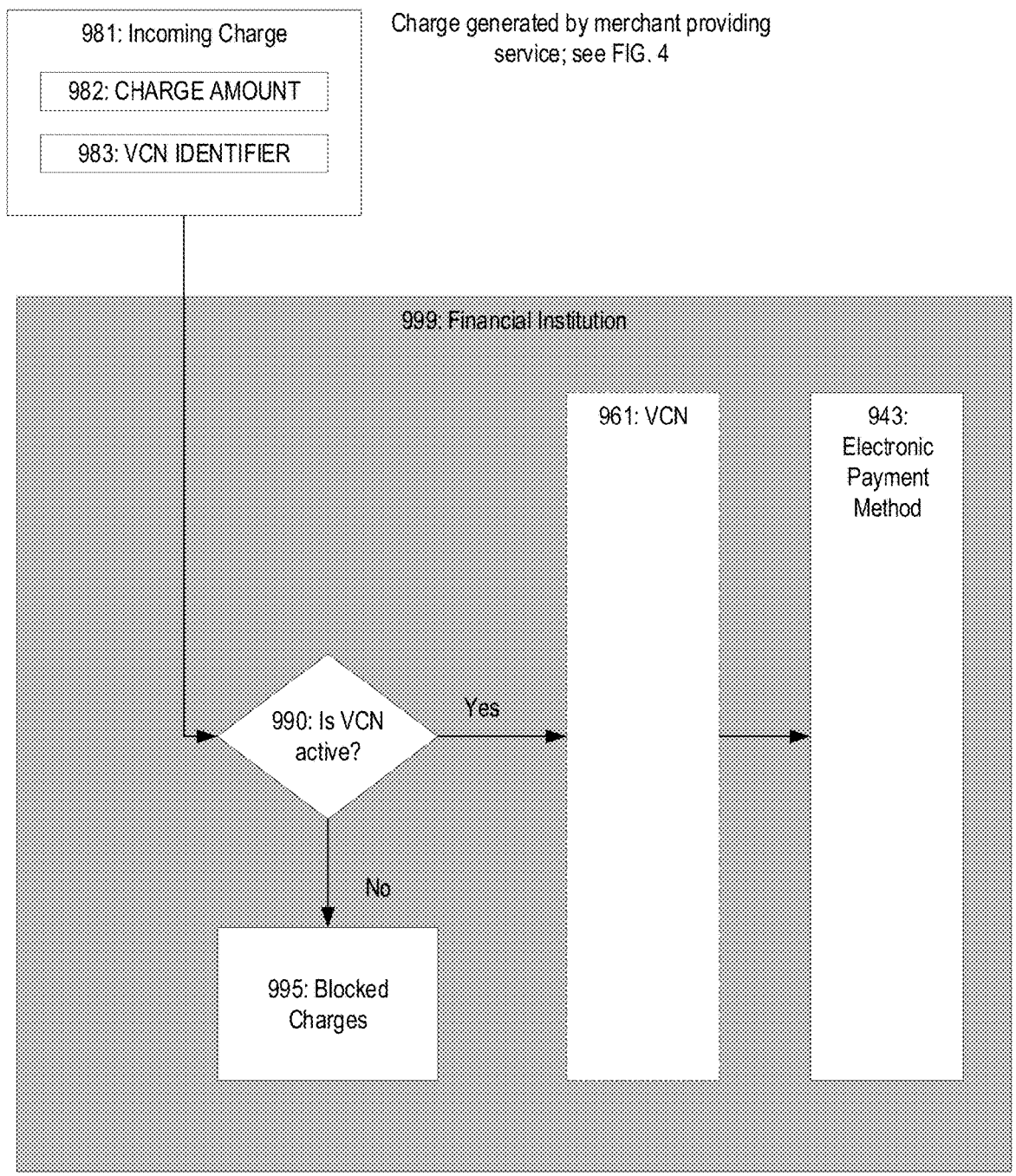
FIG. 9 depicts an illustrative flowchart for FIG. 4, showing how the financial institution receives charges addressed to the VCN according to illustrative aspects of the disclosure; and, FIG. 10 is an illustrative flowchart representation of the process for training the billing cycle prediction model according to illustrative aspects of the disclosure.

FIG. 9 depicts an illustrative flowchart for FIG. 4, showing how the financial institution can receive charges addressed to the VCN, and may be similar to the workflow discussed in connection with FIG. 4.

Financial institution 999 may receive an incoming charge 981, with data comprising a VCN identifier 983, which identifies the VCN 961 being charged, and a charge amount 982, which represents the amount that the merchant is charging for the service. The data in incoming charge 981 may be structured according to ISO 8583 or any other API accepted by the financial institution on behalf of the VCN 961. The reception of the incoming charge 981 to the VCN 961 may be similar to step 480 in FIG. 4.

At step 990, the financial institution 999 can determine if VCN 961 is still active, similar to step 490 from FIG. 4. If the VCN 961 is active, the financial institution can rout incoming charge 981 to VCN 961, similar to step 491 in FIG. 4, and to electronic payment method 943, where the user may see the incoming charge, similar to 492 in FIG. 4.

If VCN 961 is deactivated, the financial institution can prevent the incoming charge from being applied to VCN 961, similar to step 493. In this aspect, the financial institution can rout the incoming charge to a blocked charges database 995. A blocked charge in the blocked charges database 995 may later be presented to the user to decide whether to allow that charge to be allowed to apply to VCN 961. In some aspects, the financial institution blocking incoming charge 981 because VCN 961 is deactivated may be used to trigger a notification to the user, similar to the notification workflows discussed in FIGS. 5 and 8. In other aspects, the user may be able to view all blocked charges made against a VCN 961 associated with the user and determine which of those charges can be applied to VCN 961.

Figure 10:
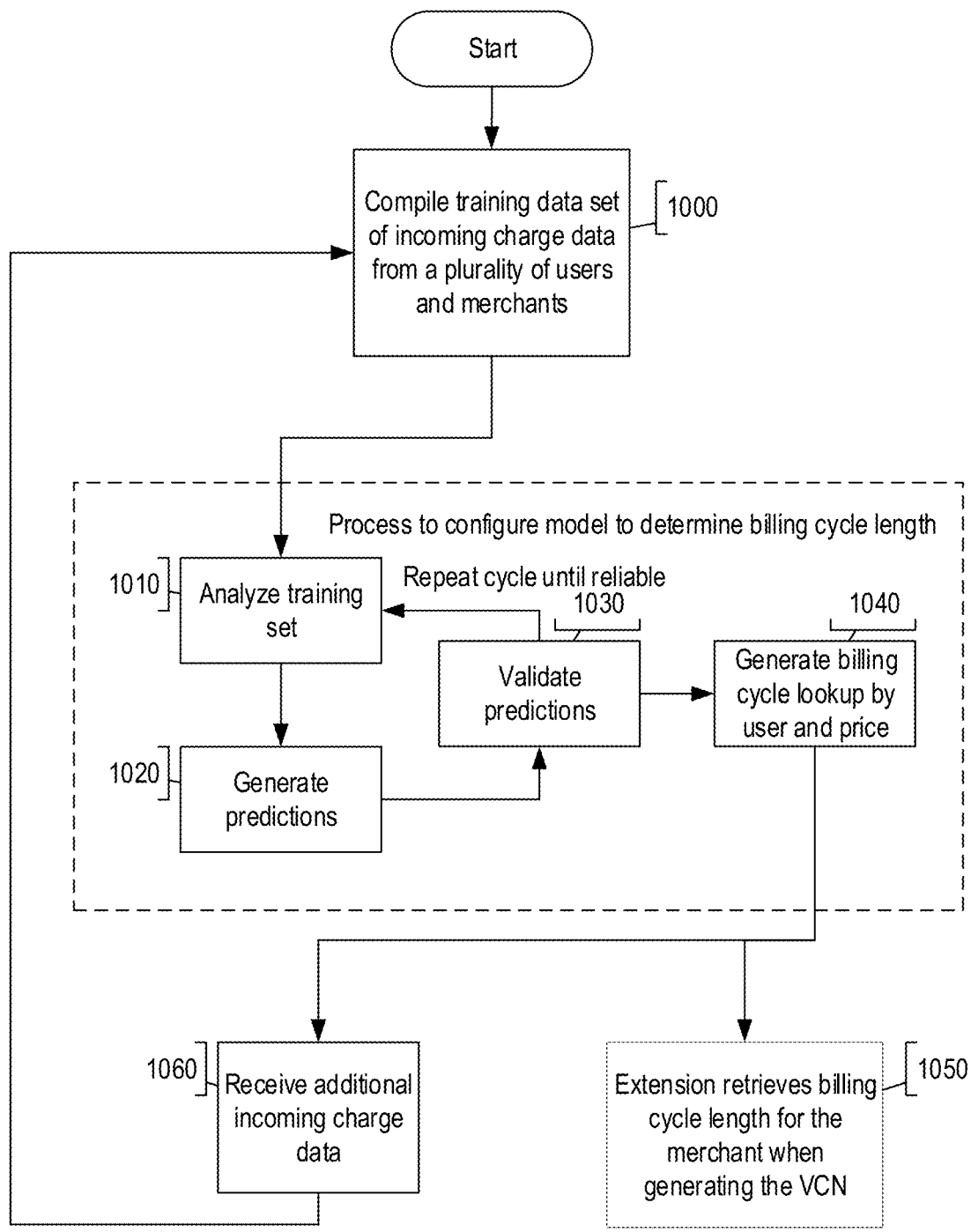

FIG. 10 depicts an illustrative configuration of the process for training the billing cycle prediction model by analyzing incoming charge data across a plurality of merchants and users, determining which charges are associated with a merchant service billed on a recurring cycle, and then determining the length of the billing cycle. The billing cycle prediction model may be a machine learning model similar to machine learning software 127 in FIG. 1, and is similar to the billing cycle prediction model referenced in step 230 in FIG. 2 or to build the billing cycle lookup 641 in FIG. 6. A similar representation may also apply to the process of training the trial length prediction model, referenced as an optional step for FIG. 2, or to build the trial length lookup 642 in FIG. 6.

First, a training set may be compiled in step 1000. The training set, similar to the training set 129 in FIG. 1, may be based on incoming charge data from a plurality of merchants and users. The training set may also be compiled based on data obtained through other mechanisms, such as merchant-provided information about how charges from those merchants will be structured, industry standards for incoming charge data, and other methods.

The billing cycle prediction model may analyze the training set in step 1010 and generate predictions in step 1020. These predictions can be validated against the known billing cycle lengths of the merchant services within the training set in step 1030. The billing cycle prediction model may then incorporate the validations and improve the model by cycling through the analysis, prediction, and validation process until the model is configured for real-time billing cycle length prediction in step 1040.

After being configured for use, in step 1050, the billing cycle prediction model can use the merchant identifier from the VCN generation process to determine the length of the billing cycle for the service which the VCN is scheduled to be charged. At this point, the merchant identification model may be used as described previously in FIG. 2. In other aspects, the billing cycle prediction model may be used to seed a database containing common merchant services and the associated billing cycle length, similar to billing cycle lookup 641 in FIG. 6, and the billing cycle lookup database may be used during VCN generation to determine the billing cycle length.

Also, after step 1040, the machine-learning model may be updated over time with new training sets in step 1060. In this step, the model may receive new sets of data and iterate through the process previously described in steps 1000 through 1040. These new sets of data may include additional sets of incoming charges, information for distinguishing multiple services or charges from the same merchant, information for distinguishing multiple billing cycle or prices for the same service, and more. These training sets may be obtained from third parties or compiled based on a plurality of incoming charge data as previously described in step 1000. After completing the training steps 1010 through 1040, the billing cycle prediction model can again be used for predicting the billing cycle for a merchant service as previously described in step 1050.

In aspects where the VCN last charge date is also based on the length of a trial for the merchant service, a similar process to that described for the billing cycle prediction model may also apply to the trial length prediction model. In these aspects, the training set may include preauthorizations and incoming charges from a plurality of merchants and users, and the analysis step used to find the time difference between the preauthorization, usually sent by the merchant at the time of user enrollment, and the first incoming charge, representing the first day after the trial ended.

These features or claims may also be embodied in alternative ways. In one possible aspect, the process for determining the last charge date and setting the VCN to be deactivated after the last charge date may be applied to the VCN expiration date. While this aspect would require the user to generate a new VCN for each active duration, this aspect can allow merchants to determine when the provided electronic payment method is expiring and avoid sending charges that will be blocked.

In another aspect, the VCN may be stored with a counter indicating the number of remaining charges allowed, rather than a deactivation date. In this aspect, the VCN generation process can determine how many billing cycles were within the user-specified active duration time, then store the number of remaining cycles with the VCN. Upon receiving an incoming charge for the VCN, the financial institution can deduct one cycle from the number of remaining cycles, deactivating the VCN after the number of remaining cycles equaled zero. In this aspect, the financial institution might generate notifications to the user when one or zero cycles remains available for the VCN.

In another aspect, the VCN may be generated with a total amount of money that can be charged to the VCN before deactivation, where the total amount of money is determined by the sum of the incoming charges necessary to pay for the merchant service for the user-specified period of time. In this aspect, after every incoming charge, the value of the incoming charge can be subtracted from the remaining amount of money on the VCN. When the remaining amount of money reached zero or was less than necessary to pay the next incoming charge, the VCN can be deactivated. In this aspect, the financial institution might generate notifications to the user when the remaining amount of money drops below a specified threshold where the specified threshold may be set in ways including, but not limited to, the value needed to pay the next incoming charge, no remaining money, a predetermined level based on user configuration, or more.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer implemented method comprising:
    detecting, via a first application executing on a user device of a user, that the user is initiating a first transaction with a first merchant for a first charge amount on the user device, wherein the first merchant and the first charge amount are identified by the first application scraping a web page associated with the first transaction and displayed on the user device;
    causing, by the first application, display of a first user interface on the user device, wherein the first user interface is a chat box allowing for communications to and from the user;
    receiving, via the first user interface, an indication from the user to generate a first virtual card number (VCN) as part of the first transaction, wherein a VCN is linked to an electronic payment method associated with the user;
    receiving, via the first user interface and from the user, an indication of a first duration of time for the first VCN to remain active;
    receiving, by the first application and from a machine learning model trained on a plurality of incoming charge data originating from a plurality of merchants, a plurality of billing cycles for the first merchant, where a billing cycle is a time between recurring incoming charges received from a merchant corresponding to an active account with the merchant;
    determining, by the first application and based on the first charge amount, a first billing cycle in the plurality of billing cycles, where the first billing cycle is associated with incoming charges similar to the first charge amount;
    predicting, by the first application and based on the first billing cycle, one or more charge dates, wherein a charge date corresponds to a beginning of an iteration of the first billing cycle;
    based on the one or more charge dates and the first duration of time, determining a last charge date, where the last charge date is associated with an iteration of the first billing cycle furthest in the future and within the first duration of time;
    generating, by the first application and as part of the first transaction, the first VCN;
    setting a deactivation date of the first VCN, wherein the deactivation date is after the last charge date;
    receiving, as part of the first transaction, a preauthorization from the first merchant to the first VCN; and
    deactivating the first VCN on the deactivation date, where a deactivated VCN blocks all incoming charges.

2. The method of claim 1 wherein generating the first VCN, further comprises:
    causing, via the first user interface, display of the last charge date before setting the deactivation date of the first VCN.

3. The method of claim 1, wherein setting the deactivation date further comprises:
    receiving acknowledgement from the user that the deactivation date is to be set after the determined last charge date.

4. The method of claim 1, further comprising:
    notifying the user, prior to the last charge date, that the first VCN will be deactivated on the deactivation date after the last charge date.

5. The method of claim 4, further comprising:
    providing the user with an option to reschedule the deactivation date of the first VCN.

6. The method of claim 5, further comprising:
    receiving, in a message from the user, an indication of a second duration of time;
    determining the second duration of time, based on natural language processing of the message;
    predicting, based on the first billing cycle and the last charge date, one or more future charge dates;
    based on the one or more future charge dates, determining an updated last charge date; and
    setting the deactivation date of the first VCN after as the updated last charge date.

7. The method of claim 1, further comprising:
    receiving, via the first user interface and as part of a second transaction, a name of a show offered by a second merchant,
    determining a second duration of time for a second VCN based on a release schedule for the show,
    determining, by the first application, a second billing cycle corresponding to an active account with the second merchant;
    based on the second duration of time, the second billing cycle, and the release schedule, determining a second last charge date based on a number of billing cycles until an end of the release schedule;
    generating, by the first application and as part of the second transaction, the second VCN; and
    setting a deactivation date of the second VCN after the second last charge date.

8. The method of claim 7, wherein determining the release schedule further comprises
    retrieving the release schedule for the show from the second merchant offering the show.

9. The method of claim 7, further comprising
    notifying the user, based on a new season of the show, that the second VCN is deactivated, and providing the user with an option to re-activate the second VCN for a number of billing cycles in a new release schedule for the new season of the show.

10. The method of claim 1, wherein receiving the first duration of time further comprises:
   receiving, via the first user interface and from the user, a number of billing cycles for which the first VCN is to be active, and
   determining the last charge date based on the number of billing cycles and the first billing cycle.

11. The method of claim 1, wherein deactivating the first VCN further comprises:
   sending a notification to the user, where the notification is based on blocking an incoming charge to the first VCN, that charges to the first VCN have been blocked.

12. The method of claim 11, further comprising:
   providing, in the notification to the user, an option to reactivate the first VCN for a duration of time.

13. The method of claim 1, wherein determining the last charge date further comprises:
   determining, by the first application, that the user is eligible for a trial period for an active account with the first merchant;
   receiving, by the first application and from the machine learning model, a length of the trial period; and
   determining the last charge date, wherein the first duration of time is counted from a last day of the trial period.

14. The method of claim 13, wherein determining that the user is eligible for a trial period further comprises:
   determining, by the first application, whether an electronic payment method associated with the user received prior incoming charges from the first merchant, wherein the prior incoming charges correspond to a billing cycle of the first merchant; and
   determining, based on a lack of prior incoming charges from the first merchant to the user, that the user is eligible for the trial period.

15. The method of claim 1, further comprising:
   determining, based on the first duration of time and the first billing cycle, that the first billing cycle exceeds the first duration of time, and
   deactivating the VCN.

16. A computing device, comprising:
   one or more processors; and
   memory storing instructions that, when executed by the one or more processors, cause the computing device to:
      detect, via a first application executing on a user device of a user, that the user is initiating a first transaction with a first merchant for a first charge amount on the user device, wherein the first merchant and the first charge amount are identified by the first application scraping a web page associated with the first transaction and displayed on the user device;
      cause, by the first application, display of a first user interface on the user device, wherein the first user interface is a chat box allowing for communications to and from the user;
      receive, via the first user interface, an indication from the user to generate a first virtual card number (VCN) as part of the first transaction, wherein a VCN is linked to an electronic payment method associated with the user;
      receive, via the first user interface and from the user, an indication of a first duration of time for the first VCN to remain active;
      receive, by the first application and from a machine learning model trained on a plurality of incoming charge data originating from a plurality of merchants, a plurality of billing cycles for the first merchant, where a billing cycle is a time between recurring incoming charges received from a merchant corresponding to an active account with the merchant,
      determine, by the first application and based on the first charge amount, a first billing cycle in the plurality of billing cycles, where the first billing cycle is associated with incoming charges similar to the first charge amount;
      predicting, by the first application and based on the first billing cycle, one or more charge dates, wherein a charge date corresponds to a beginning of an iteration of the first billing cycle;
      based on the one or more charge dates and the first duration of time, determine a last charge date, where the last charge date is associated with an iteration of the first billing cycle furthest in the future and within the first duration of time;
      generate, by the first application and as part of the first transaction, the first VCN;
      set a deactivation date of the first VCN wherein the deactivation date is after the last charge date, wherein a deactivated VCN blocks further incoming charges to the VCN;
      receive, as part of the first transaction, a preauthorization from the first merchant to the first VCN; and
      deactivate the first VCN on the deactivation date.

17. The computing device of claim 16, wherein the instructions further cause the computing device to:
   receive, in a message from the user, an indication of a second duration of time;
   determine the second duration of time, based on natural language processing of the message;
   predict, based on the first billing cycle and the last charge date, one or more future charge dates;
   based on the one or more future charge dates, determine an updated last charge date; and
   set the deactivation date of the first VCN after the updated last charge date.

18. The computing device of claim 16, wherein the instructions to determine the last charge date further cause the computing device to:
   determine, by the first application, that the user is eligible for a trial period for an active account with the first merchant;
   receive, by the first application and from the machine learning model, a length of the trial period; and
   determine the last charge date, wherein the first duration of time is counted from a last day of the trial period.

19. One or more non-transitory computer-readable media storing instructions that, when executed by one or more processors, cause a computing device to perform steps comprising:
   detecting, via a first application executing on a user device of a user, that the user is initiating a first transaction with a first merchant for a first charge amount on the user device, wherein the first merchant and first charge amount are identified by the first application scraping a web page associated with the first transaction and displayed on the user device;
   causing, by the first application, display of a first user interface on the user device, wherein the first user interface is a chat box allowing for communications to and from the user;

receiving, via the first user interface, an indication from the user to generate a first virtual card number (VCN) as part of the first transaction, wherein a VCN is linked to an electronic payment method associated with the user;

receiving, via the first user interface and from the user, an indication of a first duration of time for the first VCN to remain active;

receiving, by the first application and from a machine learning model trained on a plurality of incoming charge data originating from a plurality of merchants, a plurality of billing cycles for the first merchant, where a billing cycle is a time between recurring incoming charges receiving from a merchant corresponding to an active account with the merchant, determining, by the first application and based on the first charge amount, a first billing cycle in the plurality of billing cycles, where the first billing cycle is associated with incoming charges similar to the first charge amount;

predicting, by the first application and based on the first billing cycle, one or more charges dates, wherein a charge date corresponds to a beginning of an iteration of the first billing cycle;

based on the one or more charge dates, determining a last charge date, where the last charge date is associated with an iteration of the first billing cycle furthest in the future and within the first duration of time;

generating, by the first application and as part of the first transaction, the first VCN;

setting a deactivation date of the first VCN for after the last charge date, wherein the deactivation date is after the last charge date;

receiving, as part of the first transaction, a preauthorization from the first merchant to the first VCN; and deactivating the first VCN on the deactivation date, where a deactivated VCN blocks all incoming charges.

20. The one or more non-transitory computer-readable media of claim 19, wherein determining the last charge date further comprises:

determining, by the first application, that the user is eligible for a trial period for an active account with the first merchant;

receiving, by the first application and from the machine learning model, a length of the trial period; and determining the last charge date, wherein the first duration of time is counted from a last day of the trial period.

* * * * *